US012243349B2

United States Patent
Bradley et al.

(10) Patent No.: US 12,243,349 B2
(45) Date of Patent: Mar. 4, 2025

(54) FACE RECONSTRUCTION USING A MESH CONVOLUTION NETWORK

(71) Applicants: DISNEY ENTERPRISES, INC., Burbank, CA (US); ETH Zürich (Eidgenössische Technische Hochschule Zürich), Zürich (CH)

(72) Inventors: Derek Edward Bradley, Zurich (CH); Prashanth Chandran, Zurich (CH); Simone Foti, London (GB); Paulo Fabiano Urnau Gotardo, Zurich (CH); Gaspard Zoss, Zurich (CH)

(73) Assignees: Disney Enterprises, INC., Burbank, CA (US); ETH Zürich (Eidgenössische Technische Hochschule Zürich), Zurich (CH)

( * ) Notice: Subject to any disclaimer, the term of this patent is extended or adjusted under 35 U.S.C. 154(b) by 415 days.

(21) Appl. No.: 17/697,774

(22) Filed: Mar. 17, 2022

(65) Prior Publication Data

US 2022/0301348 A1   Sep. 22, 2022

Related U.S. Application Data

(60) Provisional application No. 63/162,204, filed on Mar. 17, 2021.

(51) Int. Cl.
G06V 40/16 (2022.01)
G06T 17/20 (2006.01)
G06V 10/44 (2022.01)

(52) U.S. Cl.
CPC ........... *G06V 40/176* (2022.01); *G06T 17/20* (2013.01); *G06V 40/166* (2022.01); *G06V 40/172* (2022.01); *G06V 10/454* (2022.01)

(58) Field of Classification Search
None
See application file for complete search history.

(56) References Cited

U.S. PATENT DOCUMENTS

| 10,331,941 B2 | 6/2019 | Rhee et al. |
| 10,692,265 B2 | 6/2020 | Hadap et al. |

(Continued)

FOREIGN PATENT DOCUMENTS

| CN | 109255831 B | 6/2020 |
| CN | 111968191 A | 11/2020 |
| CN | 112085836 A | 12/2020 |

OTHER PUBLICATIONS

Howard et al., "MobileNets: Efficient Convolutional Neural Networks for Mobile Vision Applications", arXiv:1704.04861, Apr. 17, 2017, 9 pages.

(Continued)

*Primary Examiner* — Thomas D Lee
(74) *Attorney, Agent, or Firm* — Squire Patton Boggs LLP; Sarah Mirza (57) ABSTRACT

Embodiment of the present invention sets forth techniques for performing face reconstruction. The techniques include generating an identity mesh based on an identity encoding that represents an identity associated with a face in one or more images. The techniques also include generating an expression mesh based on an expression encoding that represents an expression associated with the face in the one or more images. The techniques also include generating, by a machine learning model, an output mesh of the face based on the identity mesh and the expression mesh.

20 Claims, 5 Drawing Sheets

(56) References Cited

U.S. PATENT DOCUMENTS

| | | |
|---|---|---|
| 11,074,733 B2 | 7/2021 | Petriv et al. |
| 11,869,150 B1* | 1/2024 | Mason .................. G06N 3/0464 |
| 2021/0279956 A1* | 9/2021 | Chandran ............... G06T 17/20 |

OTHER PUBLICATIONS

Zhou et al., "On the Continuity of Rotation Representations in Neural Networks", IEEE, CVPR, 2019, pp. 5745-5753.

Gong et al., "SpiralNet++: A Fast and Highly Efficient Mesh Convolution Operator", https://github.com/sw-gong/spiralnet_plus, alarXiv:1911.05856, Nov. 13, 2019, 8 pages.

Ranjan et al., "Generating 3D faces using Convolutional Mesh Autoencoders", ECCV, arxiv:1807.10267, Jul. 31, 2018, 21 pages.

Zhou et al., "Fully Convolutional Mesh Autoencoder using Efficient Spatially Varying Kernels", 34th Conference on Neural Information Processing Systems, arXiv:2006.04325, Oct. 21, 2020, 14 pages.

Wang et al., "Pixel2Mesh: Generating 3D Mesh Models from Single RGB Images", ECCV, arXiv:1804.01654, Aug. 3, 2018, 16 pages.

Blanz et al., "A Morphable Model for the Synthesis of the 3D Faces", SIGGRAPH 99, https://doi.org/10.1145/311535.311556, 1999, pp. 187-194.

Gecer et al., "GANFIT: Generative Adversarial Network Fitting for High Fidelity 3D Face Reconstruction", In Proceedings of the IEEE Conference on Computer Vision and Pattern Recognition, arXiv:1902.05978, Apr. 6, 2019, 13 pages.

Tewari et al., "MoFA: Model-based Deep Convolutional Face Autoencoder for Unsupervised Monocular Reconstruction", In Proceedings of the IEEE International Conference on Computer Vision Workshops, arXiv:1703.10580, Dec. 7, 2017, 13 pages.

Cheng et al., "Faster, Better and More Detailed: 3D Face Reconstruction with Graph Convolutional Networks", In Proceedings of the Asian Conference on Computer Vision, 2020, 18 pages.

Lee et al., "Uncertainty-Aware Mesh Decoder for High Fidelity 3D Face Reconstruction", DOI 10.1109/CVPR42600.2020.00614, CVPR, 2020, pp. 6100-6109.

Lin et al., "Towards High-Fidelity 3D Face Reconstruction from In-the-Wild Images Using Graph Convolutional Networks", CVPR, 2020, pp. 5891-5900.

Zhou et al., "Dense 3D Face Decoding over 2500FPS: Joint Texture & Shape Convolutional Mesh Decoders", CVPR, arXiv:1904.03525, Apr. 6, 2019, pp. 1097-1106.

Shu et al., "Neural Face Editing with Intrinsic Image Disentangling", arXiv:1704.04131, Apr. 13, 2017, 22 pages.

* cited by examiner

FACE RECONSTRUCTION USING A MESH CONVOLUTION NETWORK

CROSS-REFERENCE TO RELATED APPLICATION

The present application claims the benefit of U.S. Provisional Patent Application No. 63/162,204, filed Mar. 17, 2021, titled, "FACE RECONSTRUCTION IN THE WILD USING A MESH CONVOLUTION NETWORK." The subject matter of this related application is hereby incorporated herein by reference.

BACKGROUND

Field of the Various Embodiments

The present invention relates generally to computer science and computer-generated graphics and, more specifically, to face reconstruction using a mesh convolution network, including all aspects of the related hardware, software, graphical user interfaces, and algorithms with implementing the contemplated systems, techniques, functions, and operations set forth herein.

Description of the Related Art

Realistic digital faces are required for various computer graphics and computer vision applications. For example, digital faces are oftentimes used in virtual scenes of film or television productions and in video games.

To capture photorealistic faces, a typical facial capture system employs a specialized light stage and hundreds of lights that are used to capture numerous images of an individual face under multiple illumination conditions. The facial capture system additionally employs multiple calibrated camera views, uniform or controlled patterned lighting, and a controlled setting. Further, a given face is typically scanned during a scheduled block of time, in which the corresponding individual can be guided into different expressions to capture images of individual faces. The resulting images can then be used to determine three-dimensional (3D) geometry and appearance maps that are needed to synthesize digital versions of the face.

One drawback that exists with many existing facial capture systems is the dependency on controlled settings and the physical presence of the corresponding individuals. Due to these requirements, facial capture systems cannot be used to perform facial reconstruction under various uncontrolled ("in-the-wild") conditions that include arbitrary human identities and facial expressions. Further, these uncontrolled images oftentimes depict only a single point of view and/or undetermined lighting environments. For example, film and television productions increasingly incorporate synthetic depictions of actors from a previous time (e.g., at a younger age), or of actors who have passed away. Facial geometry can be reconstructed from "legacy" footage of these actors, such as old movies and photo collections. However, this "legacy" footage often lacks multiple camera views, calibrated camera parameters, controlled lighting, desired expressions into which the actor can be guided, and/or other constraints that are required by conventional facial capture techniques. Similarly, conventional facial capture techniques are unable to construct a realistic 3D avatar of a user, given images of the user captured by a mobile phone or camera under uncontrolled conditions.

As the foregoing illustrates, what is needed in the art are more effective techniques for face reconstruction.

SUMMARY

Some embodiments of the present invention set forth techniques for performing face reconstruction. The techniques include generating an identity mesh based on an identity encoding that represents an identity associated with a face in one or more images; generating an expression mesh based on an expression encoding that represents an expression associated with the face in the one or more images; and generating, by a machine learning model, an output mesh of the face based on the identity mesh and the expression mesh.

One technical advantage of the disclosed techniques relative to the prior art is that faces can be reconstructed based on limited image data, such as legacy footage or images captured under uncontrolled conditions. Accordingly, the disclosed techniques can be used to perform face reconstruction even when the faces cannot be captured under controlled, studio-like settings. Another technical advantage of the disclosed techniques is a reconstruction of the face of an individual based on separate encodings of the identity of the individual and the expression of the individual, which can improve the accuracy of the reconstructed face. Yet another technical advantage of the disclosed techniques is an upscaling of low-resolution mappings determined from one or more images into higher-resolution geometry that incorporates the features of the identity and expression of the face. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
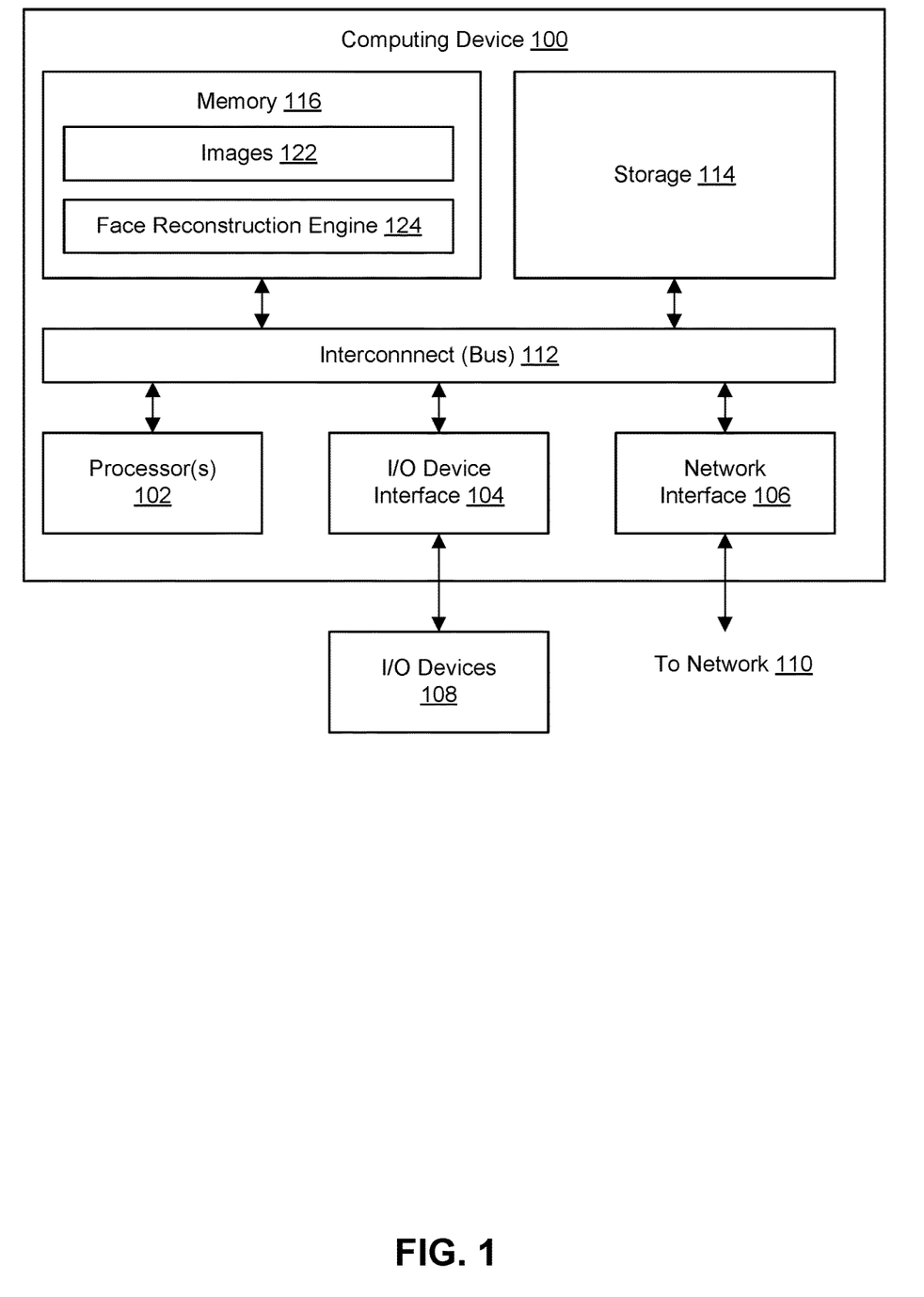
FIG. 1 illustrates a system configured to implement one or more aspects of various embodiments.

FIG. 1 illustrates a computing device 100 configured to implement one or more aspects of various embodiments. In one embodiment, computing device 100 may be a desktop computer, a laptop computer, a smart phone, a personal digital assistant (PDA), tablet computer, or any other type of computing device configured to receive input, process data, and optionally display images, and is suitable for practicing one or more embodiments.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid state storage devices.

Memory 116 includes a random access memory (RAM) module, a flash memory unit, or any other type of memory unit or combination thereof. The memory 116 stores one or more images 122. The memory 116 also stores a face reconstruction engine 124, which is described in detail below. Processor(s) 102, I/O device interface 104, and network interface 106 are configured to read data from and write data to memory 116. Memory 116 includes various software programs that can be executed by processor(s) 102 and application data associated with said software programs.

It is noted that the computing device described herein is illustrative and that any other technically feasible configurations fall within the scope of the present disclosure.

Face Reconstruction Using a Mesh Convolution Network

Figure 2:
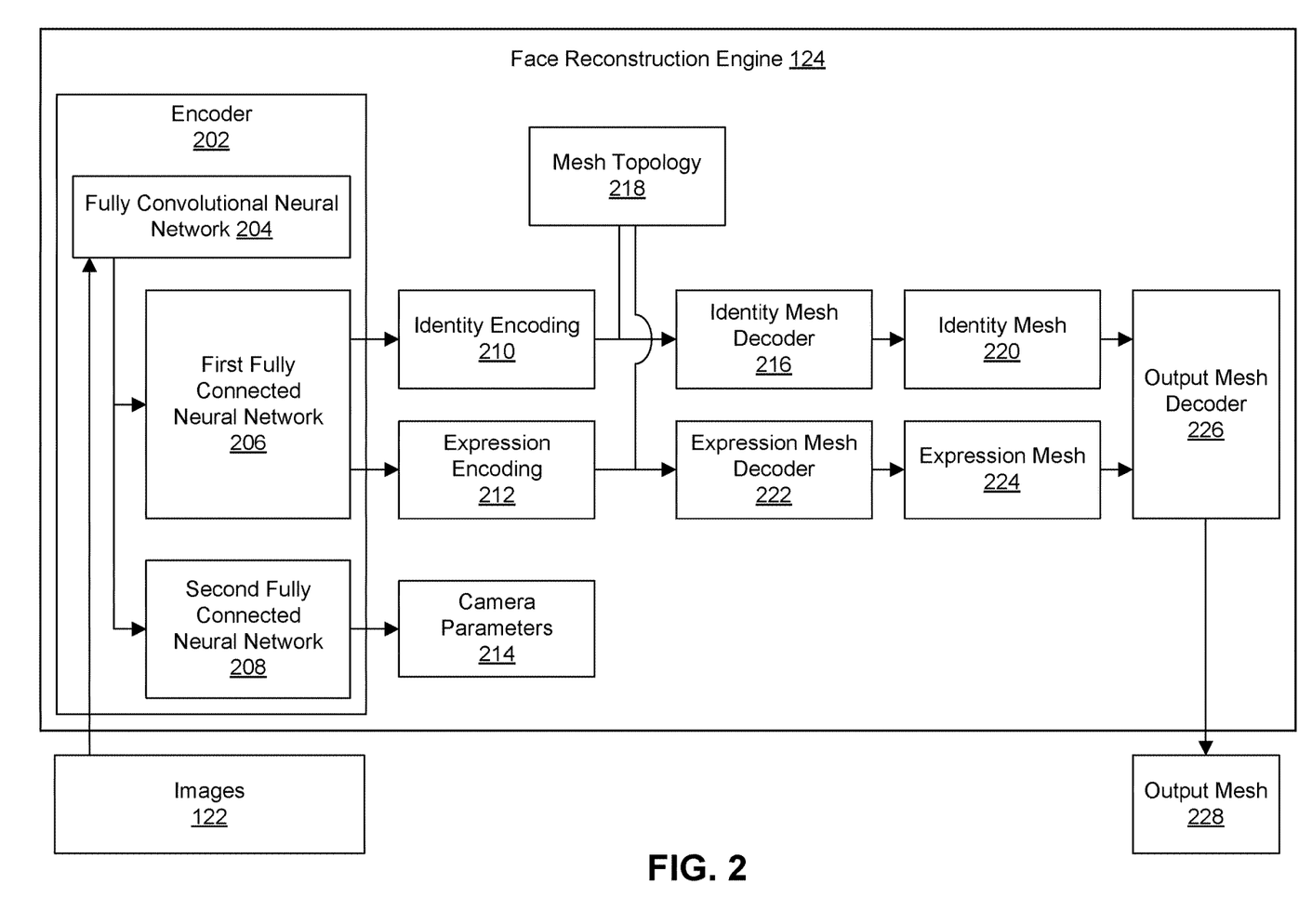
FIG. 2 illustrates an operation of the face reconstruction engine of FIG. 1, according to various embodiments.

FIG. 2 illustrates an operation of the face reconstruction engine 124 of FIG. 1, according to various embodiments. As shown, the face reconstruction engine 124 includes an encoder 202, an identity mesh decoder 216, an expression mesh decoder 222, and an output mesh decoder 226.

As shown, the encoder 202 receives one or more images 122 of a face and, for each of the one or more images 122, generates an identity encoding 210, an expression encoding 212, and one or more camera parameters 214. The identity encoding 210 includes a latent space encoding of an identity of the face in the one or more images 122. The identity encoding 210 is independent of an expression of the face in each of the one or more images 122. The expression encoding 212 includes a latent space encoding of an expression of the face in each of the one or more images 122. The expression encoding 212 is independent of an identity of the face in the one or more images 122. The one or more camera parameters 214 indicate features of the camera that are associated with each of the one or more images 122. For example and without limitation, the one or more camera parameters can include a head pose of the face with respect to the camera (e.g., a pitch orientation, a roll orientation, and/or a yaw orientation) in a given image from images 122.

More specifically, in some embodiments, the encoder 202 includes a fully convolutional neural network 204 that is coupled to a first fully connected neural network 206 and a second fully connected neural network 208. First, the encoder 202 processes each of the one or more images 122 by one or more convolutional layers of the fully convolutional neural network 204. Each convolutional layer includes one or more convolutional filters, each of which performs a depth-wise convolution over the channels of the input. Each convolutional layer outputs an activation map of features detected by each of the one or more convolutional filters. The activation map of each convolutional layer is provided as input to a next convolutional layer of the fully convolutional neural network 204, or, for the last convolutional layer, as a feature map. The first fully connected neural network 206 receives the feature map and processes (e.g., by linear combination) each feature of the feature map. A first set of output neurons of the first fully connected neural network 206 outputs the identity encoding 210, which is an encoding vector of identity features of the face within the one or more images 122. A second set of output neurons of the first fully connected neural network 206 outputs the expression encoding 212, which is an encoding vector of the expression of the face within each image 122. The second fully connected neural network 208 receives the feature map and processes (e.g., by linear combination) through two or more fully connected neuron layers. An output layer of the second fully connected neural network 208 outputs one or more camera parameters 214, which is an encoding vector of camera parameter features of each of the images. In some embodiments, one or more convolutional layers of the fully convolutional neural network 204 include a pooling layer or function, such as a global average pooling layer that adjusts an output based on a global average of the filter activations. In various embodiments, each of the first fully connected neural network 206 and the second fully connected neural network 208 includes one or more fully-connected layers. In some embodiments, one or more layers of the first fully connected neural network 206 and/or one or more layers of the second fully connected neural network 208 includes a parametric rectified linear unit (PReLU) activation function that generates, as output, a linear combination of the inputs if the combination is above a first parametric threshold and a different linear combination of the inputs if the combination is below the first parametric threshold.

The encoder 202 outputs the identity encoding 210, the expression encoding 212, and the one or more camera parameters 214 as a representation of the identity, expression, and camera parameters of the face in the image, respectively, in an encoding latent space. The latent space enables each of the identity encoding 210, the expression encoding 212, and the one or more camera parameters 214 to encode the respective identity, expression, and camera parameters of the image 122 independently of other features of the image that are represented by the other encodings. Further, each encoding is a vector of a given length that represents a lower-dimension representation of the identity, expression, or camera parameters related to the face in the image 122. In some embodiments, the face reconstruction engine 124 generates each of the encoding vectors based on an encoding length, such as a first encoding length for the identity encoding 210, a second encoding length for the expression encoding 212, and a third encoding length for the one or more camera parameters 214. For each encoding vector, a smaller encoding length can limit the encoding to focus on the most significant, distinguishing, and/or characteristic features of the identity, expression, or camera parameters of the image, which can promote uniformity among similar images and/or enable more efficient model training or inference. A larger encoding length can enable the encoding to include a larger number of features of the identity, expression, or camera parameters of the image, which can produce higher-quality face reconstruction. The encoder 202 can determine the encoding lengths of one or more of the encodings, and/or can receive the encoding lengths of one or more of the encodings (e.g., as a hyperparameter of the first fully connected neural network 206 and/or the second fully connected neural network 208).

The identity mesh decoder 216 receives the identity encoding 210 and generates an identity mesh 220. In some embodiments, the identity mesh decoder 216 receives a mesh topology 218, which is a low-resolution topology of a face having a neutral identity (e.g., an average or typical face that is not associated with any particular individual) and placed in a canonical head pose, such as an origin of a coordinate system. The mesh topology 218 can be a standard, default, template, or representative shape/layout of the face. The mesh topology 218 can include a set of vertices connected by edges, such as a graph of points or locations that respectively correspond to an eye, nose, mouth, or other such features of the face. In some embodiments, the identity mesh decoder 216 reshapes the identity encoding 210 as one or more features associated with the mesh topology 218. For example, the face reconstruction engine 124 could associate or "attach" features of the identity encoding 210 to respective locations (e.g., vertices) in the mesh topology 218 that is inputted into the identity mesh decoder 216. As a result, the identity mesh 220 associates features of the identity of the face with respective vertices of the identity mesh 220. In another example, the face reconstruction engine 124 could divide the identity encoding 210 into multiple discrete portions and attach each portion to a different vertex of the mesh topology 218 that is inputted into the identity mesh decoder 216. The identity mesh decoder 216 adjusts one or more vertices of the mesh topology 218 based on the identity encoding 210. For example and without limitation, the identity mesh decoder 216 can perform a graph convolution on the vertices, edges, and features of the mesh topology 218 to determine, for each vertex of the mesh topology 218, a coordinate displacement of the vertex and/or albedo of the vertex. In some embodiments, the identity mesh decoder 216 performs a dilated spiral convolution on the identity encoding 210, wherein the coordinate displacement for each vertex of the mesh topology 218 is based on the coordinate displacements of nearby vertices along a predetermined spiral path of the mesh topology 218. In some embodiments, the identity mesh decoder 216 includes a SpiralNet++ graph neural network or a Vc mesh convolutional neural network. In some embodiments, one or more neurons of the identity mesh decoder 216 includes an exponential linear unit (ELU) activation function. The identity mesh decoder 216 can generate the identity mesh 220 based on output dimensions that are specified as hyperparameters of the identity mesh decoder 216.

The expression mesh decoder 222 receives the expression encoding 212 and the mesh topology 218 and generates an expression mesh 224. In some embodiments, the expression mesh decoder 222 reshapes the expression encoding 212 as one or more features associated with the mesh topology 218. For example, the face reconstruction engine 124 could associate or "attach" features of the expression encoding 212 to respective locations (e.g., vertices) in the mesh topology 218 that is inputted into the expression mesh decoder 222. As a result, the expression mesh 224 associates features of the expression of the face with respective vertices of the expression mesh 224. In another example, the face reconstruction engine 124 could divide the expression encoding 212 into multiple discrete portions and attach each portion to a different vertex of the mesh topology 218 that is inputted into the expression mesh decoder 222. The expression mesh decoder 222 outputs offsets of one or more vertices of the mesh topology 218 based on the expression encoding 212. The offsets deform the mesh topology 218 and/or identity mesh 220 to match the expression of the face shown in the image 122. For example and without limitation, the expression mesh decoder 222 can perform a graph convolution on the vertices, edges, and features of the mesh topology 218 and/or identity mesh 220 to determine, for each vertex of the mesh topology 218 and/or identity mesh 220, a coordinate displacement of the vertex and/or an albedo of the vertex. In some embodiments, the identity mesh decoder 216 performs a dilated spiral convolution on the expression encoding 212 to determine, for each vertex of the mesh topology 218 and/or identity mesh 220, a displacement vector based on the nearby vertices along a predetermined spiral path of the mesh topology 218 and/or identity mesh 220. In some embodiments, the expression mesh decoder 222 includes a SpiralNet++ graph neural network or a Vc mesh convolutional neural network. The expression mesh 224 can include a displacement vector for each of the vertices of the mesh topology 218 and/or identity mesh 220 based on the expression encoding 212. In some embodiments, one or more neurons of the expression mesh decoder 222 includes an exponential linear unit (ELU) activation function. The expression mesh decoder 222 can generate the expression mesh 224 based on output dimensions that are specified as hyperparameters of the expression mesh decoder 222.

In some embodiments, the identity mesh decoder 216 includes an upsampling operation that generates an identity mesh 220 of a higher resolution than the mesh topology 218. For example, the identity mesh decoder 216 can perform a sparse matrix multiplication between a low-resolution identity mesh 220 and a weight matrix that is precomputed by downsampling a high-resolution mesh template with quadric mesh sampling, thereby producing an upsampled identity mesh 220. The mesh topology 218 can be a low-resolution mesh, and the identity mesh 220 can include adjusted coordinates of the vertices of the mesh topology 218 based on the identity encoding 210. Alternatively or additionally, in some embodiments, the expression mesh decoder 222 includes an upsampling operation that generates an expression mesh 224 of a higher resolution than the mesh topology 218. For example, the expression mesh decoder 222 can perform a sparse matrix multiplication between a low-resolution expression mesh 224 and a weight matrix that is precomputed by downsampling a high-resolution mesh template with quadric mesh sampling, thereby producing an upsampled expression mesh 224.

In some embodiments, the face reconstruction engine 124 includes one or more perceptual feature pooling operators (not shown). For example (without limitation), the face reconstruction engine 124 can include one or more perceptual feature pooling operators between the encoder 202 and the output mesh decoder 226. The perceptual feature pooling operator uses the one or more camera parameters 214 to project image features generated by encoder 202 onto the identity mesh 220 or onto the expression mesh 224. The perceptual feature pooling model performs a pooling operation that determines the features of each vertex of the mesh based on image features for a subset of pixels (e.g., a block of four adjacent pixels) projected onto the location of the vertex, such as by bilinear interpolation. The perceptual feature pooling operator can mask occluded vertices based on the one or more camera parameters 214 (e.g., vertices of the identity mesh 220 or the expression mesh 224 that are occluded based on a head pose of the image 122). The perceptual feature pooling model can include an adaptive instance normalization layer to compensate for domain differences between the image 122 and the features of the identity mesh 220 or the expression mesh 224.

The output mesh decoder 226 includes a machine learning model that receives a combination of the identity mesh 220 and the expression mesh 224 as input. For example, input into the output mesh decoder 226 could include a mesh that is generated by adding the per-vertex displacements in expression mesh 224 to the corresponding vertices in identity mesh 220. The output mesh decoder 226 uses the combination of the identity mesh 220 and the expression mesh 224 to generate an output mesh 228. The output mesh 228 combines the identity features of the identity mesh 220 and the expression features of the expression mesh 224 of the face in the one or more images 122. In some embodiments, the output mesh decoder 226 performs a dilated spiral graph convolution on the identity mesh 220 and the expression mesh 224. In some embodiments, the output mesh decoder 226 includes a SpiralNet++ graph neural network or a Vc mesh convolutional neural network. In some embodiments, the output mesh 228 is a matrix that includes three-dimensional coordinates of each vertex of the output mesh 228 and an albedo color (e.g., an RGB albedo) for each vertex of the output mesh 228.

In some embodiments, the output mesh decoder 226 performs an upsampling operation on the identity mesh 220 and/or the expression mesh 224, to generate an output mesh 228 with a resolution that is higher than a resolution of one or both of the identity mesh 220 or the expression mesh 224. For example, the output mesh decoder 226 can perform a sparse matrix multiplication between the vertices of the generated output mesh and a weight matrix that is precomputed by downsampling a high-resolution mesh template with quadric mesh sampling, thereby generating an upsampled output mesh 228.

In some embodiments that include one or more perceptual feature pooling operators, the face reconstruction engine 124 also includes an image decoder (not shown). The output mesh decoder 226 generates a set of vertex coordinates based on the identity mesh 220 and the expression mesh 224. Based on identity encoding 210, the expression encoding 212, and the one or more camera parameters 214, the image decoder generates a texture map and a UV mapping of coordinates of the texture map to the vertex coordinates generated by the output mesh decoder 226. The texture map can be of a higher resolution than the resolution of the vertex coordinates generated by the output mesh decoder 226. The face reconstruction engine 124 receives the set of vertex coordinates from the output mesh decoder 226 and the texture map and the UV mapping from the image decoder. The face reconstruction engine 124 generates the output mesh 228 based on the set of vertex coordinates, the texture map, and the UV mapping. These embodiments refactor the determination of the output mesh 228 as a first determination of the geometry of the output mesh 228 by the output mesh decoder and the albedo and vertex displacements by the image decoder, which can generate higher-resolution details than a combined output mesh decoder 226 that determines all features of the output mesh 228.

Figure 3:
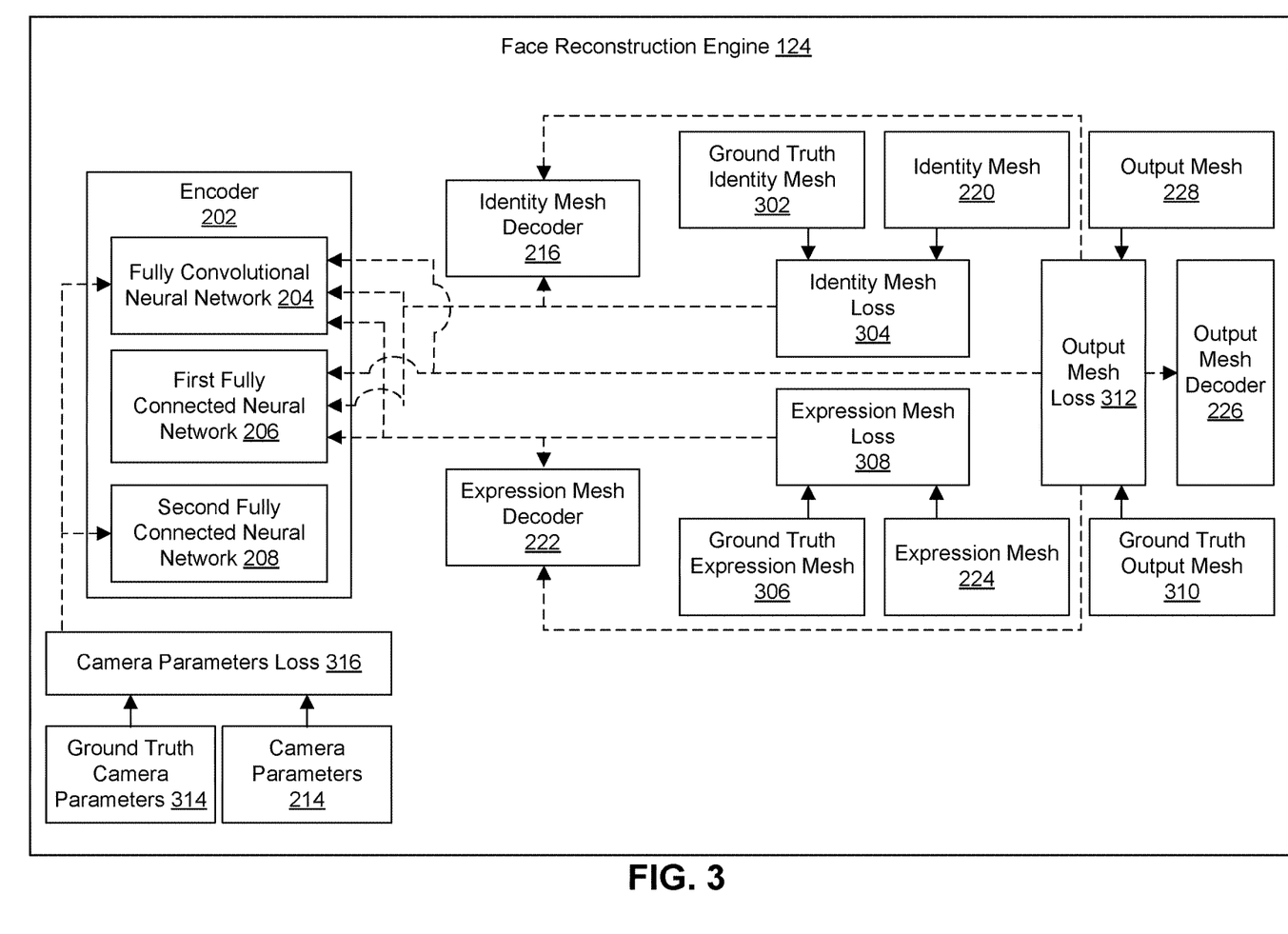
FIG. 3 illustrates a training of the face reconstruction engine of FIG. 1, according to various embodiments.

FIG. 3 illustrates a training of the face reconstruction engine 124 of FIG. 1, according to various embodiments. As shown, the face reconstruction engine 124 includes the encoder 202, the identity mesh decoder 216, the expression mesh decoder 222, and the output mesh decoder 226. The dotted lines in FIG. 3 indicate an association between one of the determined losses and one or more of the elements of the face reconstruction engine 124 that can be trained based on the determined loss.

As previously discussed, the face reconstruction engine 124 processes one or more images 122 to generate the image encoding 210, the expression encoding 212, the identity mesh 220, the expression mesh 224, and the output mesh 228. As shown, the face reconstruction engine 124 can train the encoder 202, the identity mesh decoder 216, the expression mesh decoder 222, and the output mesh decoder 226 based on the generated encodings and meshes and corresponding ground-truth encodings and meshes provided as training data. Based on the generated encodings and meshes and the ground truth encodings and meshes, the face reconstruction engine 124 determines a set of losses that can be used to train the encoder and/or decoders.

The training data can include a ground truth identity mesh 302, which is an identity mesh that accurately represents the identity of the individual whose face appears in the one or more images 122. The ground truth identity mesh 302 can include a mesh of the face with a neutral expression and placed in a canonical head pose. The face reconstruction engine 124 generates an identity mesh loss 304 that indicates a difference between the generated identity mesh 220 and the ground truth identity mesh 302. The identity mesh loss 304 can include an L2 distance between per-vertex coordinates of the generated identity mesh 220 and the corresponding per-vertex coordinates of the ground truth identity mesh 302. The identity mesh loss 304 can include an L1 distance of a per-vertex albedo between the generated identity mesh 220 and the corresponding per-vertex albedo of the ground truth identity mesh 302. In some embodiments, the identity mesh loss 304 includes a weighted combination of the L2 distances between the per-vertex coordinates and the L1 distances of the per-vertex albedo.

The training data can include, for a subset of the one or more images 122, a ground truth expression mesh 306, which is an expression mesh that accurately represents an expression of the face as it appears in the subset of the one or more images 122. The face reconstruction engine 124 generates an expression mesh loss 308 that indicates a difference between the generated expression mesh 224 and the ground truth expression mesh 306. The expression mesh loss 308 can include, for example, an L2 distance between the per-vertex displacement vectors of the generated expression mesh 224 and the corresponding displacement vectors of the ground truth expression mesh 306, and/or the L1 distance of a per-vertex albedo between the generated identity mesh 220 and the corresponding per-vertex albedo of the ground truth identity mesh 302. In some embodiments, the expression mesh loss 308 includes a weighted combination of the L2 distances between the per-vertex displacement vectors and the L1 distances of the per-vertex albedo.

The training data can include, for at least one of the one or more images 122, a ground truth output mesh 310, which is an output mesh that accurately represents the face as it appears in the at least one of the one or more images 122. The face reconstruction engine 124 generates an output mesh loss 312 that indicates a difference between the generated output mesh 228 and the ground truth output mesh 310. The output mesh loss 312 can include, for example, an L2 distance between the per-vertex coordinates of the generated output mesh 228 and the corresponding coordinates of the ground truth output mesh 310, and/or the L1 distance of a per-vertex albedo between the generated output mesh 228 and the corresponding per-vertex albedo of the ground truth output mesh 310. In some embodiments, the face reconstruction engine 124 generates the output mesh loss 312 based on a smoothing term, such as a Laplacian smoothing term, to minimize local curvature of the gradient.

The training data can include, for a subset of the one or more images 122, one or more ground truth camera parameters 314 that accurately indicate the one or more camera parameters for the subset of the one or more images (e.g., one or more labels that indicate the head pose of the face as shown in the subset of the one or more images). The face reconstruction engine 124 generates a camera parameter loss 316 based on the one or more camera parameters 214 and the one or more ground truth camera parameters 314. In some embodiments, the face reconstruction engine 124 generates the camera parameter loss 316 based on an L1 distance between the one or more camera parameters 214 and the one or more ground truth camera parameters 314. The face reconstruction engine 124 can also normalize each camera parameter in the one or more camera parameters 214, e.g., by subtracting a mean of the one or more camera parameters 214 and dividing by a standard deviation of the one or more camera parameters 214.

As shown, the face reconstruction engine 124 trains one or more of the encoder 202, the identity mesh decoder 216, the expression mesh decoder 222, and the output mesh decoder 226 based on the determined losses. The training can include, for example, a backpropagation operation in which the face reconstruction engine 124 updates the weights and/or biases of one or more layers or filters of the encoder or decoder based on the loss. More specifically, as shown, the face reconstruction engine 124 backpropagates each loss selectively through the components of the face reconstruction that are associated with the loss. That is, the face reconstruction engine 124 can backpropagate losses associated with each of the identity mesh 220, the expression mesh 224, the output mesh 228, and the one or more camera parameters 214 through the components of the face reconstruction engine 124 that are involved in the generation of the meshes. For example and without limitation, the face reconstruction engine 124 can backpropagate the identity mesh loss 304 through the identity mesh decoder 216, the fully convolutional neural network 204, and the first fully connected neural network 206. The face reconstruction engine 124 can backpropagate the expression mesh loss 308 through the expression mesh decoder 222, the fully convolutional neural network 204, and the first fully connected neural network 206. The face reconstruction engine 124 can backpropagate the output mesh loss 312 through the identity mesh decoder 216, the expression mesh decoder 222, the output mesh decoder 226, the fully convolutional neural network 204, and the first fully connected neural network 206. The face reconstruction engine 124 can backpropagate the camera parameter loss 316 through fully convolutional neural network 204 and the second fully connected neural network 208.

The face reconstruction engine 124 can perform the backpropagation-based training shown in FIG. 3 for each of the one or more images 122. The face reconstruction engine 124 can monitor a magnitude of each loss for one or more training epochs as a measurement of training progress, that is, the accuracy of the output of the encoder 202 and each of the decoders with respect to an expected output for each of the images 122. Based on the training losses, the face reconstruction engine 124 can determine a conclusion of training (e.g., when the one or more of the losses is within a loss threshold).

In some embodiments, during training, the identity mesh decoder 216 determines an identity consistency loss based on the identity encoding 210 generated for the one or more images 122. The identity consistency loss indicates a difference between the identity encoding 210 generated for each of the one or more images 122. The face reconstruction engine 124 can train the encoder 202 based on the identity consistency loss. Training the encoder based on the identity consistency loss can constrain the identity encoding 210 generated from images 122 of the same person to be substantially the same, thereby resulting in the generation of substantially the same identity mesh 220 for the images 122 of the same person during training.

In some embodiments, the face reconstruction engine 124 performs the training in batches, wherein each batch includes a subset of the one or more images 122. The face reconstruction engine 124 can determine a set of losses for each image 122 of the batch. After processing each of the images of the batch, the face reconstruction engine 124 can perform the backpropagation operations shown in FIG. 3 (e.g., based on an average of each of the losses determined for the images of the batch) to update the weights and biases of the neurons and/or filters of the encoder and decoders. The batch sizes can be a hyperparameter of the face reconstruction engine 124.

In some embodiments, for each image received as training input, the face reconstruction engine 124 can normalize a set of vertices in one or both of the generated identity mesh 220 or the generated expression mesh 224 based on the batch. As a first example (without limitation), the face reconstruction engine 124 can determine an average identity mesh by averaging the generated identity meshes 220 for each of the one or more images 122 and compute an identity mesh standard deviation of the generated identity meshes 220 for each of the one or more images 122. The face reconstruction engine 124 can then normalize each identity mesh 220 by subtracting the average identity mesh from the identity mesh 220 and dividing the result by the identity mesh standard deviation. As a second example (without limitation), the face reconstruction engine 124 can determine an average expression mesh by averaging the generated expression meshes 224 for each of the one or more images 122 and computing an expression mesh standard deviation of the generated expression meshes 224 for each of the one or more images 122. The face reconstruction engine 124 can then normalize each expression mesh 224 by subtracting the average expression mesh from the expression mesh 224 and dividing the result by the expression mesh standard deviation. As a third example (without limitation), the face reconstruction engine 124 can determine an average output mesh by averaging the generated output meshes 228 for each of the one or more images 122 and computing an output mesh standard deviation of the generated output meshes 228 for each of the one or more images 122. The face reconstruction engine 124 can then normalize each output mesh 228 by subtracting the average output mesh from the output mesh 228 and dividing the result by the output mesh standard deviation. The normalizing can be applied to the identity mesh 220, the expression mesh 224, and the output mesh 228 during one or both of training or inference.

Figure 4:
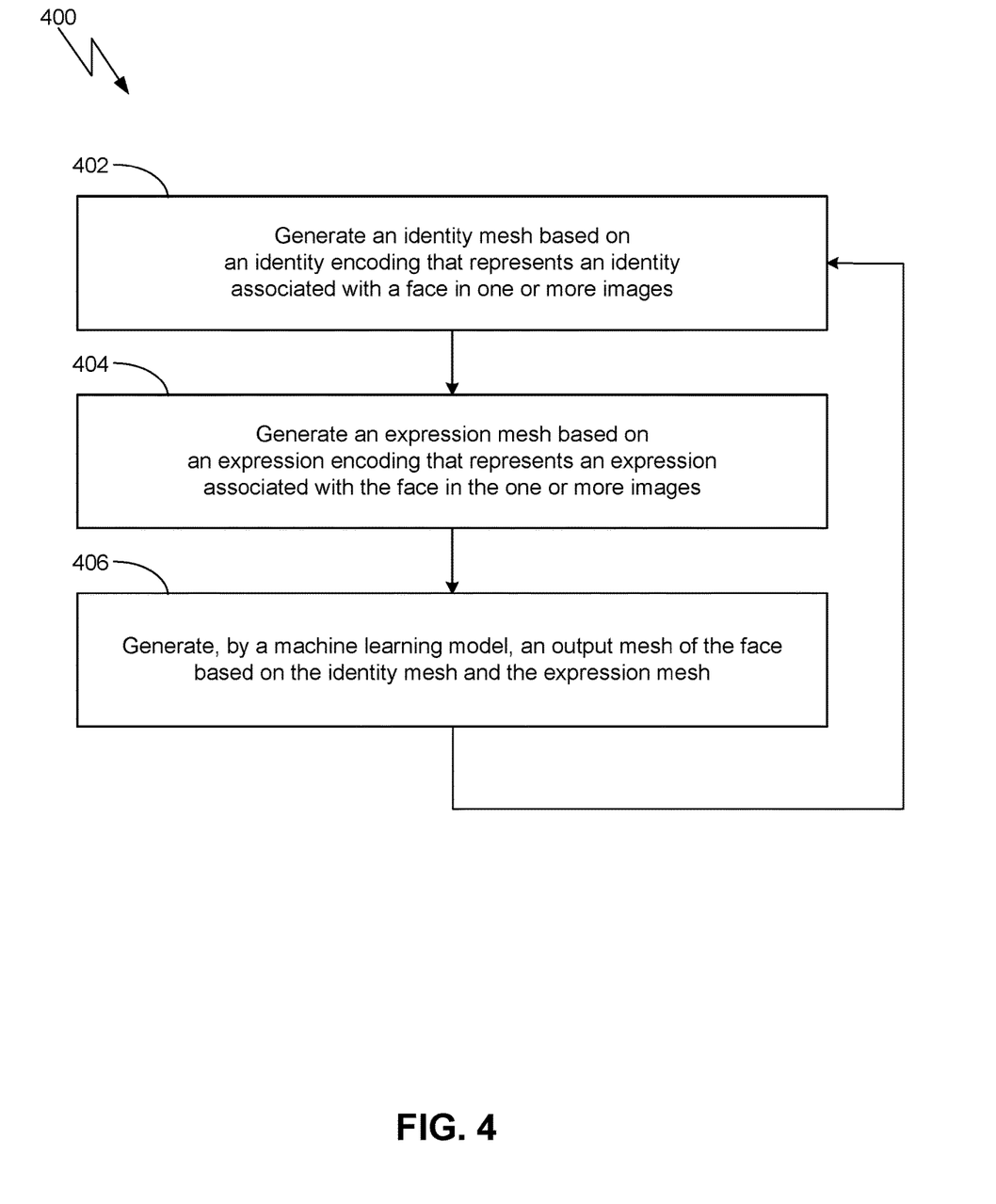
FIG. 4 is a flow diagram of method steps for generating an output mesh of a face, according to various embodiments.

FIG. 4 is a flow diagram of method steps for generating an output mesh of a face, according to various embodiments. Although the method steps are described in conjunction with the systems of FIGS. 1 and 2, persons skilled in the art will understand that any system configured to perform the method steps in any order falls within the scope of the present disclosure.

As shown, in step 402, the face reconstruction engine generates an identity mesh based on an identity encoding that represents an identity associated with a face in one or more images. An encoder of the face reconstruction engine can generate the identity encoding based on identity features of the face in the one or more images in a latent space, wherein the identity encoding is independent of an expression of the face in each of the one or more images. A first mesh decoder of the face reconstruction engine can generate the identity mesh by adjusting one or more vertices of a mesh topology based on the identity encoding. The first mesh decoder can also associate or "attach" features associated with the identity encoding to the vertices of the mesh topology.

In step 404, the face reconstruction engine generates an expression mesh based on an expression encoding that represents an expression associated with the face in the one or more images. An encoder of the face reconstruction engine can generate the expression encoding based on expression features of the face in each of the one or more images, wherein the expression encoding is independent of the identity of the face in the one or more images. A second mesh decoder of the face reconstruction engine can generate the expression mesh by adjusting one or more vertices of a mesh topology based on the expression encoding. The second mesh decoder can also associate or "attach" features associated with the expression encoding to the vertices of the mesh topology.

In step 406, the face reconstruction engine generates, by a machine learning model, an output mesh of the face based on the identity mesh and the expression mesh. The machine learning model can be a third mesh decoder of the face reconstruction engine that generates the output mesh by combining the identity mesh and the expression mesh. The machine learning model can generate the output mesh based on upsampling one or both of the identity mesh or the expression mesh, resulting in an output mesh of a higher resolution than either the identity mesh or the expression mesh. The method can return to step 402 to generate additional output meshes based on additional images.

Figure 5:
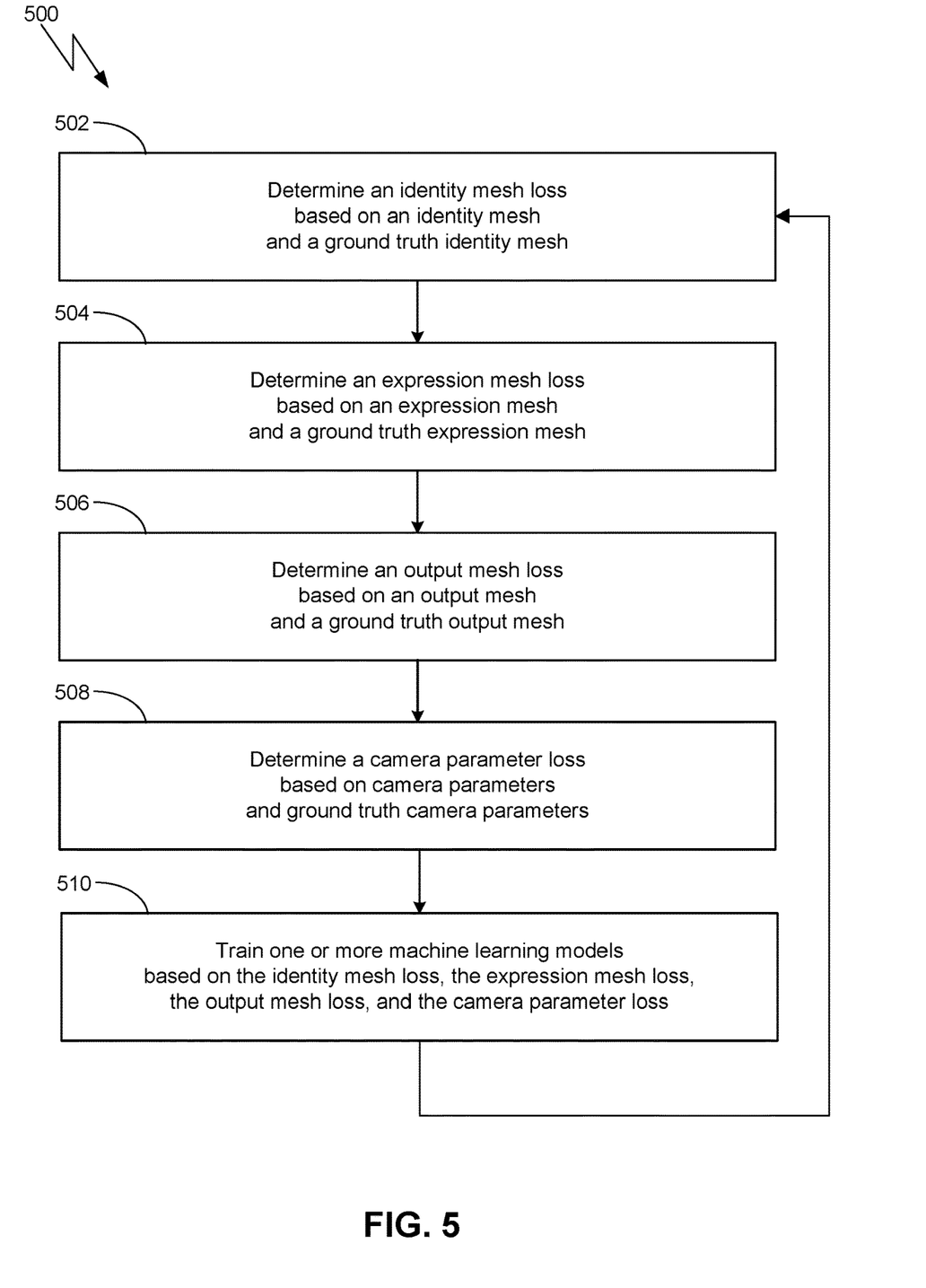
FIG. 5 is a flow diagram of method steps for training a face reconstruction engine, according to various embodiments.

FIG. 5 is a flow diagram of method steps for training a face reconstruction engine, according to various embodiments. Although the method steps are described in conjunction with the systems of FIGS. 1 and 3, persons skilled in the art will understand that any system configured to perform the method steps in any order falls within the scope of the present disclosure.

As shown, in step 502, the face reconstruction engine determines an identity mesh loss based on a generated identity mesh and a ground truth identity mesh. The ground truth identity mesh can be, for example, a reference mesh of the face in the one or more images with a neutral expression. In some embodiments, the face reconstruction engine determines the identity mesh loss based on a weighted sum of (i) an L2 distance of the per-vertex coordinates between the generated identity mesh and the ground truth identity mesh and (ii) an L1 distance of per-vertex albedo between the generated identity mesh and the ground truth identity mesh.

In step 504, the face reconstruction engine determines an expression mesh loss based on a generated expression mesh and a ground truth expression mesh. The ground truth expression mesh can be, for example, an expression reference mesh of the face of the individual with the expression in one or more of the one or more images. In some embodiments, the face reconstruction engine determines the expression mesh loss based on a weighted sum of (i) an L2 distance of the per-vertex coordinates between the generated expression mesh and the ground truth expression mesh and (ii) an L1 distance of per-vertex albedo between the generated expression mesh and the ground truth expression mesh.

In step 506, the face reconstruction engine determines an output mesh loss based on the output mesh and a ground truth output mesh. The face reconstruction engine can determine the mesh loss based on a smoothing term, such as a Laplacian smoothing term, to minimize local curvature of the gradient.

In step 508, the face reconstruction engine determines a camera parameter loss based on the one or more camera parameters and one or more ground truth camera parameters. In some embodiments, the face reconstruction engine normalizes the one or more camera parameters, for example, by subtracting a mean of the one or more camera parameters and dividing by a standard deviation of the one or more camera parameters.

In step 510, the face reconstruction engine trains one or more machine learning models based on the identity mesh loss, the expression mesh loss, the output mesh loss, and the camera parameter loss. In some embodiments, the face reconstruction engine can use the identity mesh loss and the output mesh loss to train a first mesh decoder that generates the identity mesh. The face reconstruction engine can use the expression mesh loss and the output mesh loss to train a second mesh decoder that generates the expression mesh. The face reconstruction engine can use the output mesh loss to train a third mesh decoder that generates the output mesh. The face reconstruction engine can use the identity mesh loss, the expression mesh loss, the output mesh loss, and the camera parameter loss to train an encoder that generates the identity encoding, the expression encoding, and the one or more camera parameters. The method can return to step 502 to further train the face reconstruction engine based on further generated meshes.

In sum, the disclosed techniques perform face reconstruction. An encoder generates an identity encoding that represents an identity of the face in one or more images and an expression encoding that represents an expression of the face in the one or more images. A first decoder generates an identity mesh based on the identity encoding and a mesh topology. A second decoder generates an expression mesh based on the expression encoding and the mesh topology. A third decoder generates an output mesh based on the identity mesh and the expression mesh. The output mesh accurately reconstructs the geometry of the face, including the identity and expression of the user, based on the one or more images.

One technical advantage of the disclosed techniques relative to the prior art is that faces can be reconstructed based on limited image data, such as legacy footage or images captured under uncontrolled conditions. Accordingly, the disclosed techniques can be used to perform face reconstruction even though the individual is unavailable for image capturing under controlled, studio-like settings. Another technical advantage of the disclosed techniques is a reconstruction of the face of an individual based on separate encodings of the identity of the individual and the expression of the individual, which can improve the accuracy of the reconstructed face. Yet another technical advantage of the disclosed techniques is an upscaling of the geometry of the face, based on low-resolution mappings determined from one or more images, to higher-resolution geometry that incorporates the features of the identity and expression of the face. These technical advantages provide one or more technological improvements over prior art approaches.

1. In some embodiments, a computer-implemented method for performing reconstruction of a face comprises generating an identity mesh based on an identity encoding that represents an identity associated with a face in one or more images; generating an expression mesh based on an expression encoding that represents an expression associated with the face in the one or more images; and generating, by a machine learning model, an output mesh of the face based on the identity mesh and the expression mesh.

2. The computer-implemented method of clause 1, wherein the expression mesh associates one or more expression features with one or more locations of a mesh topology, and the identity mesh associates one or more identity features with one or more locations of the mesh topology.

3. The computer-implemented method of clauses 1 or 2, further comprising generating, based on the one or more images of the face, one or more camera parameters associated with the one or more images.

4. The computer-implemented method of clause 3, further comprising adjusting one or both of the identity mesh or the expression mesh based on a feature selection, the feature selection being based on the one or more camera parameters.

5. The computer-implemented method of clauses 3 or 4, further comprising training the machine learning model based on one or more losses, the one or more losses including one or more of, an identity loss based on the generated identity mesh and a ground truth identity mesh of the face, an expression loss based on the generated expression mesh and a ground truth expression mesh of the face, an output mesh loss based on the generated output mesh and a ground truth mesh, or a camera parameter loss based on the one or more camera parameters and one or more ground truth camera parameters.

6. The computer-implemented method of any of clauses 1-5, wherein each of the expression mesh and the identity mesh includes one or both of a set of vertex coordinates or a set of vertex displacement vectors.

7. The computer-implemented method of any of clauses 1-6, wherein a resolution of the output mesh is higher than a resolution of one or both of the identity mesh or the expression mesh.

8. The computer-implemented method of any of clauses 1-7, further comprising training the machine learning model based on an identity consistency loss, wherein the identity consistency loss is based on identity encodings associated with each of the one or more images.

9. The computer-implemented method of any of clauses 1-8, further comprising normalizing a set of vertices in one or both of the identity mesh or the expression mesh, wherein the normalizing is based on a difference between the one or both of the identity mesh or the expression mesh and an average mesh.

10. In some embodiments, one or more non-transitory computer readable media store instructions that, when executed by one or more processors, cause the one or more processors to perform the steps of: generating an identity mesh based on an identity encoding that represents an identity associated with a face in one or more images; generating an expression mesh based on an expression encoding that represents an expression associated with the face in the one or more images; and generating, by a machine learning model, an output mesh of the face based on the identity mesh and the expression mesh.

11. The one or more non-transitory computer readable media of clause 10, wherein the expression mesh associates one or more expression features with one or more locations of a mesh topology, and the identity mesh associates one or more identity features with one or more locations of the mesh topology.

12. The one or more non-transitory computer readable media of clauses 10 or 11, further comprising generating, based on the one or more images of the face, one or more camera parameters associated with the one or more images.

13. The one or more non-transitory computer readable media of clause 12, further comprising adjusting one or both of the identity mesh or the expression mesh based on a feature selection, the feature selection being based on the one or more camera parameters.

14. The one or more non-transitory computer readable media of clauses 12 or 13, wherein the instructions further cause the one or more processors to perform the step of training the machine learning model based on one or more losses, the one or more losses including one or more of, an identity loss based on the generated identity mesh and a ground truth identity mesh of the face, an expression loss based on the generated expression mesh and a ground truth expression mesh of the face, an output mesh loss based on the generated output mesh and a ground truth mesh, or a camera parameter loss based on the one or more camera parameters and one or more ground truth camera parameters.

15. The one or more non-transitory computer readable media of any of clauses 10-14, wherein each of the expression mesh and the identity mesh includes one or both of a set of vertex coordinates or a set of vertex displacement vectors.

16. The one or more non-transitory computer readable media of any of clauses 10-15, wherein a resolution of the output mesh is higher than a resolution of one or both of the identity mesh or the expression mesh.

17. The one or more non-transitory computer readable media of any of clauses 10-16, wherein the instructions further cause the one or more processors to perform the step of training the machine learning model based on an identity consistency loss, wherein the identity consistency loss is based on identity encodings associated with each of the one or more images.

18. The one or more non-transitory computer readable media of any of clauses 10-17, wherein the instructions further cause the one or more processors to perform the step of normalizing a set of vertices in one or both of the identity mesh or the expression mesh, wherein the normalizing is based on a difference between the one or both of the identity mesh or the expression mesh and an average mesh.

19. In some embodiments, a system comprises one or more memories that store instructions, and one or more processors that are coupled to the one or more memories and, when executing the instructions, are configured to generate an identity mesh based on an identity encoding that represents an identity of a face in one or more images; generate an expression mesh based on an expression encoding that represents an expression of the face in the one or more images of the face; and generate, by a machine learning model, an output mesh of the face based on the identity mesh and the expression mesh.

20. The system of clause 19, wherein the one or more processors, when executing the instructions, are configured to train the machine learning model based on one or more losses, the one or more losses including one or more of, an identity loss based on the generated identity mesh and a ground truth identity mesh of the face, an expression loss based on the generated expression mesh and a ground truth expression mesh of the face, an output mesh loss based on the generated output mesh and a ground truth mesh, or a camera parameter loss based on one or more camera parameters and one or more ground truth camera parameters.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for performing reconstruction of a face, the computer-implemented method comprising:
   generating an identity mesh based on an identity encoding that represents an identity associated with a face in one or more images;
   generating an expression mesh based on an expression encoding that represents an expression associated with the face in the one or more images; and generating, by a machine learning model, an output mesh of the face via an upsampling operation associated with at least one of the identity mesh or the expression mesh.

2. The computer-implemented method of claim 1, wherein the expression mesh associates one or more expression features with one or more locations of a mesh topology, and the identity mesh associates one or more identity features with one or more locations of the mesh topology.

3. The computer-implemented method of claim 1, further comprising generating, based on the one or more images of the face, one or more camera parameters associated with the one or more images.

4. The computer-implemented method of claim 3, further comprising adjusting one or both of the identity mesh or the expression mesh based on a feature selection, the feature selection being based on the one or more camera parameters.

5. The computer-implemented method of claim 3, further comprising training the machine learning model based on one or more losses, the one or more losses including one or more of,
an identity loss based on the generated identity mesh and a ground truth identity mesh of the face,
an expression loss based on the generated expression mesh and a ground truth expression mesh of the face,
an output mesh loss based on the generated output mesh and a ground truth mesh, or
a camera parameter loss based on the one or more camera parameters and one or more ground truth camera parameters.

6. The computer-implemented method of claim 1, wherein each of the expression mesh and the identity mesh includes one or both of a set of vertex coordinates or a set of vertex displacement vectors.

7. The computer-implemented method of claim 1, wherein a resolution of the output mesh is higher than a resolution of one or both of the identity mesh or the expression mesh.

8. The computer-implemented method of claim 1, further comprising training the machine learning model based on an identity consistency loss, wherein the identity consistency loss is based on identity encodings associated with each of the one or more images.

9. The computer-implemented method of claim 1, further comprising normalizing a set of vertices in one or both of the identity mesh or the expression mesh, wherein the normalizing is based on a difference between the one or both of the identity mesh or the expression mesh and an average mesh.

10. One or more non-transitory computer readable media storing instructions that, when executed by one or more processors, cause the one or more processors to perform the steps of:
generating an identity mesh based on an identity encoding that represents an identity associated with a face in one or more images;
generating an expression mesh based on an expression encoding that represents an expression associated with the face in the one or more images; and
generating, by a machine learning model, an output mesh of the face via an upsampling operation associated with at least one of the identity mesh or the expression mesh.

11. The one or more non-transitory computer readable media of claim 10, wherein the expression mesh associates one or more expression features with one or more locations of a mesh topology, and the identity mesh associates one or more identity features with one or more locations of the mesh topology.

12. The one or more non-transitory computer readable media of claim 10, further comprising generating, based on the one or more images of the face, one or more camera parameters associated with the one or more images.

13. The one or more non-transitory computer readable media of claim 12, further comprising adjusting one or both of the identity mesh or the expression mesh based on a feature selection, the feature selection being based on the one or more camera parameters.

14. The one or more non-transitory computer readable media of claim 12, wherein the instructions further cause the one or more processors to perform the step of training the machine learning model based on one or more losses, the one or more losses including one or more of,
an identity loss based on the generated identity mesh and a ground truth identity mesh of the face,
an expression loss based on the generated expression mesh and a ground truth expression mesh of the face,
an output mesh loss based on the generated output mesh and a ground truth mesh, or
a camera parameter loss based on the one or more camera parameters and one or more ground truth camera parameters.

15. The one or more non-transitory computer readable media of claim 10, wherein each of the expression mesh and the identity mesh includes one or both of a set of vertex coordinates or a set of vertex displacement vectors.

16. The one or more non-transitory computer readable media of claim 10, wherein a resolution of the output mesh is higher than a resolution of one or both of the identity mesh or the expression mesh.

17. The one or more non-transitory computer readable media of claim 10, wherein the instructions further cause the one or more processors to perform the step of training the machine learning model based on an identity consistency loss, wherein the identity consistency loss is based on identity encodings associated with each of the one or more images.

18. The one or more non-transitory computer readable media of claim 10, wherein the instructions further cause the one or more processors to perform the step of normalizing a set of vertices in one or both of the identity mesh or the expression mesh, wherein the normalizing is based on a difference between the one or both of the identity mesh or the expression mesh and an average mesh.

19. A system, comprising:
one or more memories that store instructions, and
one or more processors that are coupled to the one or more memories and,
when executing the instructions, are configured to:
generate an identity mesh based on an identity encoding that represents an identity of a face in one or more images;
generate an expression mesh based on an expression encoding that represents an expression of the face in the one or more images of the face; and
generate, by a machine learning model, an output mesh of the face via an upsampling operation associated with at least one of the identity mesh or the expression mesh.

20. The system of claim 19, wherein the one or more processors, when executing the instructions, are configured to train the machine learning model based on one or more losses, the one or more losses including one or more of,
an identity loss based on the generated identity mesh and a ground truth identity mesh of the face, an expression loss based on the generated expression mesh and a ground truth expression mesh of the face,
an output mesh loss based on the generated output mesh and a ground truth mesh, or
a camera parameter loss based on one or more camera parameters and one or more ground truth camera parameters.

* * * * *